T. J. BYROM.
TROLLING BAIT.
APPLICATION FILED DEC. 14, 1909.
963,860.
Patented July 12, 1910.
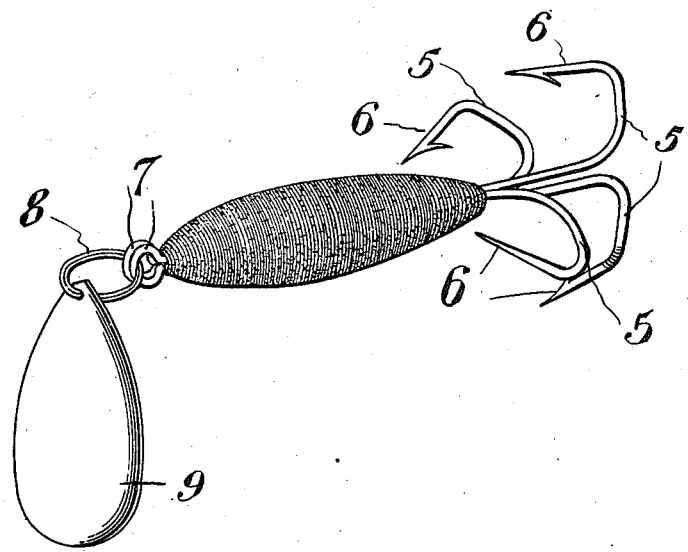
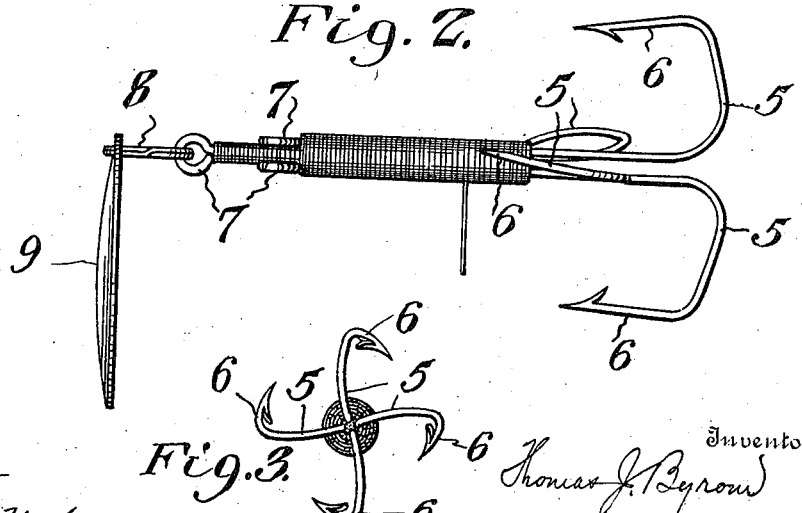

UNITED STATES PATENT OFFICE.

THOMAS J. BYROM, OF HARRIMAN, TENNESSEE.

TROLLING-BAIT.

963,860.  Specification of Letters Patent.  Patented July 12, 1910.

Application filed December 14, 1909. Serial No. 533,075.

*To all whom it may concern:*

Be it known that I, THOMAS J. BYROM, a citizen of the United States, residing at Harriman, in the county of Roane and State of Tennessee, have invented certain new and useful Improvements in Trolling-Baits, of which the following is a specification, reference being had to the accompanying drawings.

This invention has relation to certain new and useful improvements in artificial fishing bait and more particularly to a device of the above character of that type commonly designated trolling baits.

The primary object of my invention is to provide a simple trolling bait which may be inexpensively produced and is extremely efficient in use.

A further object is to provide a plurality of hooks arranged and associated in such manner as to secure the maximum efficiency in a hook of this character and to provide new and novel means for binding said hooks in such associated relation, the binding means serving as an additional attraction to the fish as the bait is moved through the water.

With these and other objects in view, my invention consists in the novel combination and arrangement of parts which will be more fully hereinafter described and specifically pointed out in the appended claims.

In the drawing Figure 1 is a perspective view of a trolling bait illustrating one embodiment of the invention; Fig. 2 is a side elevation, the binding cord being partially removed to more clearly illustrate the interior arrangement of the hook shanks; and Fig. 3 is an end elevation.

Referring more particularly to the drawing 5 indicates a plurality of hooks which may be of any preferred size and are preferably arranged in the manner shown in Fig. 1, wherein it will be noted that the hooks are arranged in pairs diametrically opposed to each other and the points thereof are disposed at an inclination to the hook shanks, as shown at 6. It will further be observed that one pair of the hooks are disposed inwardly or above the other pair, the eyes 7 thereof being alined to receive the split ring 8. The eyes of the other pair of hooks are positioned upon opposite sides of the shanks of the first named pair, as is clearly shown in Fig. 2 of the drawings. Cord or silk, preferably of a brilliant red color, is tightly wound about the hook shanks, entirely covering the eyes of the lower hooks and extending up to the eyes of the upper hooks. This cord is so wound as to provide an elongated elliptical body portion which is adapted to be covered with paraffin to render the body very solid and compact and prevent the loosening of the cord or silk. To the split ring 8 the spoon 9 is adapted to be attached and in the operation of the device, as the trolling bait is drawn through the water, the brilliant color of the body portion thereof is reflected upon this plate, the surface of which is highly polished. Thus the fish are naturally greatly attracted thereto and become impaled upon the points 6 of the hooks.

From the foregoing it will be seen that I have provided a trolling bait of very novel construction which may be produced at a very low cost and is highly efficient and durable in use.

While I have above described the preferable arrangement of the hooks and the means for securing the same together, it will be understood that the invention is susceptible of numerous minor modifications without departing from the spirit or sacrificing any of the advantages thereof.

Having thus described the invention what is claimed is:

1. The herein described trolling bait comprising a plurality of hooks, said hooks being arranged in pairs, one pair of hooks being disposed at right angles to the other pair, the shanks of one pair of said hooks being disposed upon the shanks of the other pair, the ends of each of the hook shanks having an eye formed thereon, the eyes of one pair of hook shanks being disposed close together, the eyes of the other hook shanks being disposed at right angles to the first named eyes, a brilliantly colored cord wound around said hook shanks and covering the latter pair of eyes, said cord forming an elliptical body on the shanks and adapted to secure the hooks in their proper relative positions, the remaining pair of eyes extending beyond said body and a spoon attached to said exposed eyes and adapted to be disposed in longitudinal relation to the body, substantially as and for the purpose set forth.

2. The herein described trolling bait comprising a plurality of hooks arranged in pairs, the shanks of one pair of hooks being disposed in close engagement upon each other, the end of each of said hook shanks having an eye formed thereon, a cord wound upon said hook shanks to secure the same together, the other pair of hooks having their shanks disposed upon the cord binding the first pair of hooks together and extending beyond the bills of the first named hooks, the end of the shanks of the last named pair of hooks having an eye formed thereon, said eyes being disposed at right angles to the eyes of the first named shanks, said binding cord being then wound around the latter pair of hook shanks and over the eyes thereof whereby said pairs of hooks are securely held in their proper relative positions, the eyes of the first named pair of hooks being left exposed, substantially as and for the purpose set forth.

In testimony whereof I hereunto affix my signature in the presence of two witnesses.

THOMAS J. BYROM.

Witnesses:
 A. J. PIERCE,
 FRED NAYLOR.